Patented June 7, 1938

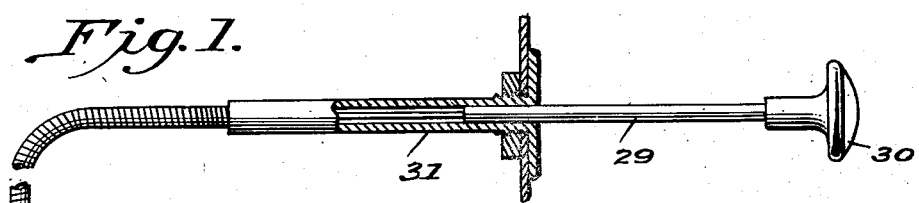
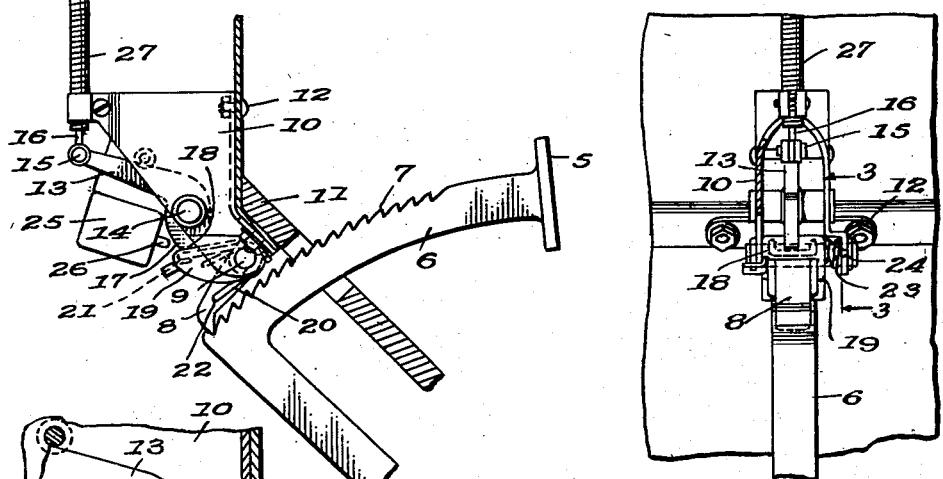
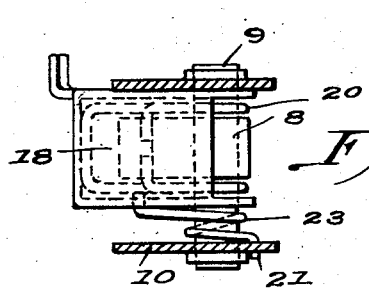

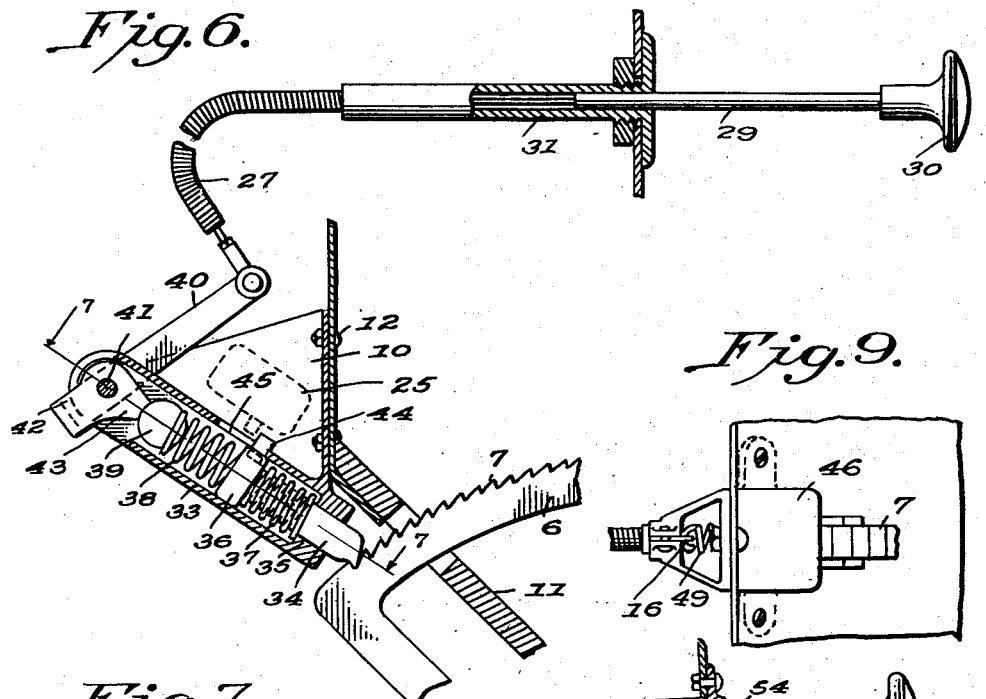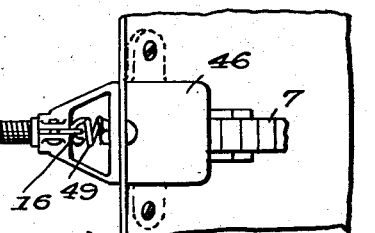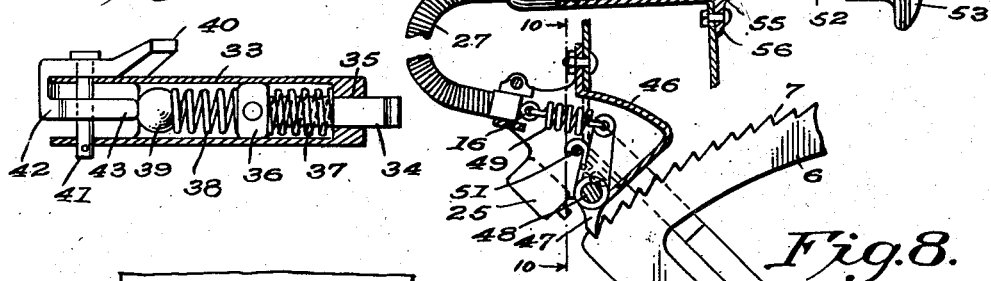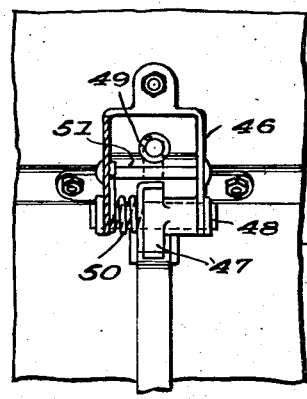

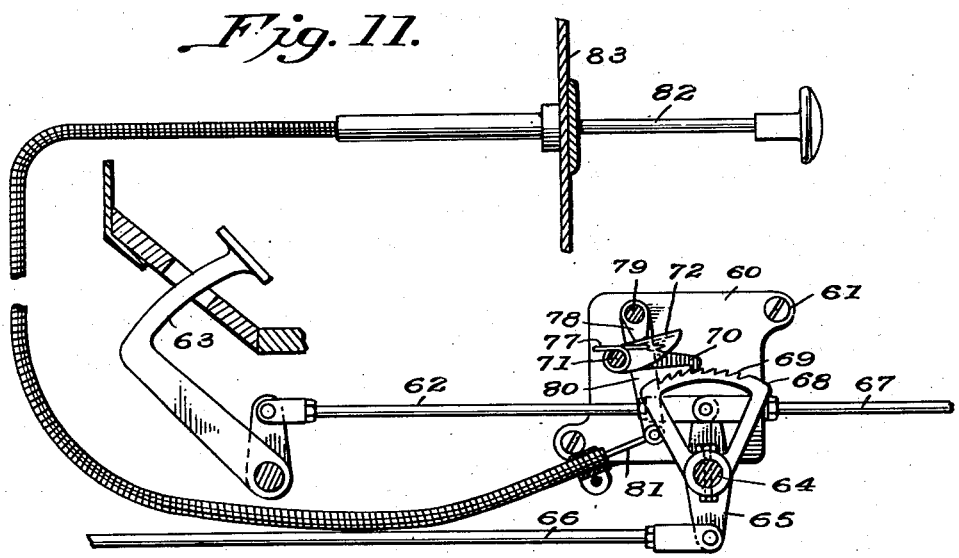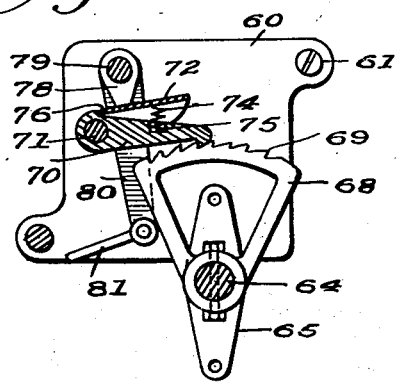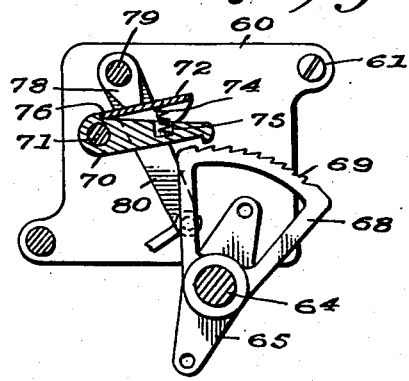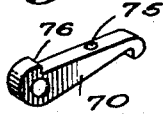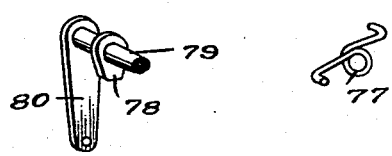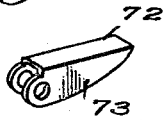

2,119,638

UNITED STATES PATENT OFFICE 2,119,638

PARKING BRAKE

Godfried F. Klampferer, Dearborn, Mich.

Application March 17, 1936, Serial No. 69,284

3 Claims. (Cl. 74—540)

My invention relates to brake controlling mechanism and has for its primary object to provide means for holding the foot brake of an automobile applied, while the machine is at rest, thus eliminating the need for an emergency brake.

A further object of the invention is to provide automatic means for locking the foot pedal operating the service brakes of an automobile in a depressed position, so the brakes will remain applied and manually operable means for controlling the automatic means.

Another object of the invention is to provide a mechanism of the above-mentioned character which is simple and durable in construction, reliable and efficient in operation and inexpensive to manufacture.

Other objects and advantages of the invention will be apparent during the course of the following description.

In the accompanying drawings, forming a part of this specification and in which like numerals are employed to designate like parts throughout the same, Fig. 1 is a side elevation of the mechanism, Fig. 2 is a rear view of the same, Fig. 3 is a section taken on line 3—3 of Fig. 2, Fig. 4 is a section taken on line 4—4 of Fig. 3, Fig. 5 is a side elevation of another form of mechanism, Fig. 6 is a side elevation of still another form of mechanism, Fig. 7 is a longitudinal section taken on line 7—7 of Fig. 6, Fig. 8 is a side elevation of still another form of the mechanism, Fig. 9 is a top view of the mechanism shown in Fig. 8, Fig. 10 is a vertical section taken on line 10—10 of Fig. 8, Fig. 11 is a side elevation of a further modified form of the invention, Fig. 12 is an enlarged side elevation of the latch mechanism shown in Fig. 11, Fig. 13 is a similar view showing the latch mechanism in released position, Fig. 14 is a perspective view of the latch dog, Fig. 15 is a perspective view of the follower plate for the latch dog, Fig. 16 is a perspective view of the cam and lever for operating the same, and, Fig. 17 is a perspective view of the spring for the follower plate.

In the drawings; wherein for the purpose of illustration, I have shown the preferred forms of the invention, the numeral 5 denotes the service brake pedal of an automobile having the usual shank 6. In accordance with the present invention, the rear edge of the shank 6 has formed therein a series of ratchet teeth 7 adapted to be engaged by the locking dog 8 pivotally mounted on the pin 9 supported in the side walls of the sheet metal bracket 10. The bracket 10 is attached to the floor board 11 of an automobile, by means of bolts 12 and has its lower end, in which the pin 9 is supported disposed adjacent the shank of the brake pedal. A bell crank lever 13 is mounted on the shaft 14 supported by the side walls of the bracket 10 above the dog 8 and has a relative long arm connected at its free end, as at 15, to one end of a flexible cable or rod 16 and a short arm in the form of a cam 17 which contacts with the top of the follower plate 18 having depending side flanges 19 disposed in straddling relation to the dog 8 and pivotally mounted on the pin 9. The dog 8 and plate 18 are yieldably connected together by a U spring 20 formed of wire which is bent around the pin 9 and has one end connected to the plate 18, as at 21, and its opposite end connected to the dog 8, as at 22. A coil spring 23 is mounted on the pin 9 having one end connected to the side wall of the bracket 10, as at 24, and its opposite end connected to the flange 19 of the plate 18, which normally urges the dog 8 and plate 18 away from the shank 6 of the pedal 5. An electric switch 25 which is interposed in the circuit of the conventional stop light is disposed adjacent the lever 13, so that the cam 17 will engage the push button 26 of the switch to close the circuit when the lever is actuated. The flexible cable 16 extends through a conduit 27 to the dash board 28 of the automobile and is connected to the shank 29 of a hand knob 30, the shank being slidably mounted in a sleeve 31 mounted in the dashboard.

To operate, the hand knob 30 is pulled outwardly from the dashboard which through the cable 16 rocks the lever 13, so that the cam 17 depresses the plate 18 and dog 8 against the tension of the spring 23, thereby causing the dog to engage the ratchet teeth 7 of the shank 6 of the brake pedal 5. The dog 8 through its yieldable connection 20 with the plate 18 is permitted to ride over the ratchet teeth as the pedal 5 is depressed to apply the brakes. The dog through its engagement with the ratchet teeth holds the pedal depressed and the brakes applied, until the knob 30 is pushed inwardly which rocks the lever 13 and releases the plate 18 and dog 8, so that the dog 8 is moved out of engagement with the ratchet teeth through action of the spring 23.

In Fig. 5, another form of the invention is shown which differs from the form shown in Fig. 1, in that the plate 18 and dog 8 are positioned in the bracket 10 in a reverse direction and are yieldably connected together by a coil spring 32 instead of the U spring 20. In this form the switch 25 is mounted between the side walls of the bracket 10.

In Figs. 6 and 7, I have shown still another form of the invention which includes the bracket 10 having formed between the side walls thereof a cylinder 33 arranged at an angle with its lower end disposed adjacent the shank 6 of the pedal 5. A locking dog 34 is slidably mounted in the cylinder and projects through an opening 35 in the bottom thereof for engagement with the ratchet teeth 7. A head 36 is formed integral with the upper end of the dog and mounted on the dog between the head 36 and bottom of the cylinder is a coil spring 37 which normally urges the dog away from engagement with the ratchet teeth. Mounted within the cylinder on the opposite side of the head 36 is another coil spring 38, which establishes yieldable connection between the head of the dog and the ball 39 disposed in the upper end of the cylinder. A lever 40 is pivotally connected to the upper end of the cylinder by the pivot pin 41 having a reversely bent end 42 which extends into the cylinder and terminates in a cam 43 for engagement with the ball 39. The free end of the lever 40 is connected to the flexible cable 16 leading to the hand knob 30. The head 36 has a laterally projecting lug 44 extending through a longitudinal slot 45 in the side of the cylinder which guides the movement of the dog and actuates the switch 25.

In operation it will be seen that by pulling the cable 16 the lever 40 is rocked, causing the cam 43 to engage and depress the ball 39 which through the spring 38 forces the dog 34 outwardly into engagement with the teeth 7 of the shank 6 of the pedal 5. When the dog is depressed the spring 37 is compressed and when the lever 40 is rocked to release the ball, the spring 37 moves the dog out of engagement with the ratchet teeth.

In Figs. 8, 9, and 10, I have shown still another form of the invention consisting of a bracket 46 mounted within an opening in the floor board of the automobile in which is mounted a locking dog 47 pivotally mounted on the shaft 48 supported by the walls of the bracket. The upper end of the locking dog is connected by the coil spring 49 to the end of the flexible cable 16 establishing yieldable connection between the cable and dog. A coil spring 50 is mounted on the shaft 48 having one end connected to the pin 51 and its opposite end engaged with the rear edge of the locking dog above the shaft 48, which normally urges the dog out of engagement with the ratchet teeth 7 of the shank 6 of the pedal 5. In this form the shank 52 of the hand knob 53 connected to the free end of the cable 16 is provided with a notch 54 adapted to engage with the edge of the opening 55 in the plate 56 through which the shank extends, to hold the hand knob in its extended position.

In operation, when the hand knob is pulled outward the cable 16 through the spring 49 rocks the locking dog 47 into engagement with the ratchet teeth 7 of the shank 6 of the pedal. Upon releasing the hand knob the spring 50 moves the locking dog out of engagement with the teeth and returns the hand knob to its normal position.

In Figs. 11 to 17 inclusive, a further modification of the invention is shown which consists of a bracket plate 60 which is attached to the frame of the vehicle by bolts 61 at a point adjacent the connection between the connecting bar 62 of the brake pedal 63 and the rocker shaft 64. The rocker shaft 64 carries a link 65 which establishes connection between the brake rods 66 and 67 connected to the front and rear brakes of the vehicle. A quadrant 68 is fixedly mounted on the rocker shaft 64 provided with a series of ratchet teeth 69 along its upper edge which are adapted to be engaged by the locking dog 70 pivotally mounted on the pin 71 projecting from the bracket plate 60. A follower plate 72 having side flanges 73 is pivotally mounted on the pin 71 in straddling relation to the dog 70 and disposed between the follower plate and dog is a coil spring 74 seated in the recess 75 in the top of the dog which yieldably holds the dog in engagement with the teeth 69 of the quadrant 68. A shoulder 76 is formed transversely of the rear end of the top face of the dog, which serves as an abutment for the rear end of the follower plate 72 and thereby limits the upward movement of the plate with respect to the dog. A coil spring 77 mounted on the pin 71 has one end attached to one of the flanges 73 of the follower plate and its opposite end to the bracket plate 60. This spring normally exerts an upward tension on the follower plate and serves to lift the dog out of engagement with the ratchet teeth 69 of the quadrant 68. A cam 78 normally depresses the follower plate and is moved into and out of engagement with the follower plate by the shaft 79 extending from the bracket plate, on which it is mounted, the shaft being turned by the depending lever 80 which is connected to one end of the flexible cable 81 connected to the pull rod 82 mounted on the dash board 83 of the vehicle.

In operation, when the pull rod 82 is pulled outwardly the lever 80 is actuated to rotate the shaft 79 and cause the cam 78 to depress the follower plate 72 against the tension of the spring 77, thereby permitting the spring 74 to hold the dog 70 in yielding contact with the teeth 69 of the quadrant 68 so as to secure the brake rods in their adjusted positions. To release the latch mechanism, the pull rod 82 is pushed inwardly which actuates the lever 80 to release the cam 78, whereupon the follower plate is raised upwardly by the spring 77 which by reason of its rear end abutting the shoulder 76 of the dog causes the dog to be lifted out of engagement with the teeth 69 releasing the quadrant.

It is to be understood that the form of my invention herewith shown and described is to be taken as a preferred example of the same and that certain changes in the shape, size and arrangement of the parts may be made without departing from the spirit of the invention or the scope of the subjoined claims.

Having thus described my invention, I claim:—

1. The combination with a foot brake pedal including a shank, of means for holding the brake applied, said means including a pivoted dog for engagement with said shank to hold the latter depressed, a pivoted follower plate yieldably connected with said dog, a spring normally urging said dog out of engagement with said shank, and a manually controlled lever for moving said follower plate and dog to operative position against the tension of said spring.

2. The combination with the braking mechanism of a vehicle, of a latching device for holding the braking mechanism in its applied position including a quadrant adapted to move with the braking mechanism, said quadrant having a series of ratchet teeth on its upper edge, a pivotally mounted locking dog adapted to engage the teeth of said quadrant, a pivoted follower plate disposed over said dog adapted to lift said dog out of engagement with said teeth when swung upwardly, spring means normally urging said follower plate upwardly, manually controlled means for depressing said follower plate, and yieldable means disposed between said follower plate and locking dog.

3. The combination with the braking mechanism of a vehicle, of a latching device for holding the braking mechanism in its applied position, including a rack bar associated with the braking mechanism and moved thereby, a pivoted locking dog adapted to engage said rack bar, a follower plate disposed in straddling relation to said dog and pivotally mounted on the pivot of said dog, a spring yieldably connecting said dog and plate together, a spring normally holding said dog and plate in an inoperative position and means for depressing said follower plate to move said dog to an operative position.

GODFRIED F. KLAMPFERER.